United States Patent [19]

Baker

[11] 4,155,977
[45] May 22, 1979

[54] POLLUTION CONTROL SYSTEM

[76] Inventor: Bob G. Baker, 2721 Selma La., Dallas, Tex. 75234

[21] Appl. No.: 823,730

[22] Filed: Aug. 11, 1977

[51] Int. Cl.$^2$ .................. B01D 47/02; B01D 47/00; B01D 50/00; B01J 1/22

[52] U.S. Cl. .................................. 422/62; 55/248; 55/256; 55/257 PP; 55/270; 55/275; 55/DIG. 30; 261/77; 261/113; 261/122; 422/170

[58] Field of Search ............... 23/252 A, 253 A, 283, 23/260, 285; 55/248, 256, 257 PP, 270, 275, 390, DIG. 30; 261/77, 113, 121, 122, 124; 423/242; 110/215, 119

[56] References Cited

U.S. PATENT DOCUMENTS

| | | | |
|---|---|---|---|
| 2,676,670 | 4/1954 | Gagnaire | 261/113 X |
| 2,721,065 | 10/1955 | Ingram | 261/124 |
| 3,522,692 | 8/1970 | Brookman et al. | 261/122 X |
| 3,756,171 | 9/1973 | De Bord | 261/124 X |
| 3,781,407 | 12/1973 | Kamijo et al. | 423/242 |
| 3,799,076 | 3/1974 | Graves | 110/215 |
| 3,826,816 | 7/1974 | McCormick | 23/260 X |
| 3,904,376 | 9/1975 | Kawata | 423/242 X |
| 3,989,464 | 11/1976 | Cornell | 23/260 |
| 3,989,465 | 11/1976 | Onnen | 23/253 A X |
| 4,047,891 | 9/1977 | Schuetz | 23/253 A X |

*Primary Examiner*—Michael S. Marcus
*Attorney, Agent, or Firm*—Fraser and Bogucki

[57] ABSTRACT

A compact but highly integrated pollution control system for use with a coal or lignite burning electrical power generating plant utilizes a stabilized continuously monitored and controlled bath through which is passed gaseous effluent containing particulate matter. In one form this may comprise a chimney of partial stainless steel construction for carrying smoke from the furnace of the plant into a body of water contained within an enclosed concrete tank where the water chemically interacts with and precipitates solids from the smoke. Within the tank a dynamic system is established which is held stable both mechanically and chemically during continuous operation. A stainless steel grill mounted just below the surface of the water breaks up air bubbles to entrap solid particles and enhance formation of a sediment. Fumes and vapors formed above the surface of the water are drawn into and scrubbed by at least one fume scrubber mounted at the top of the enclosed tank, with any resulting water being returned to the body of water at the bottom of the tank. Acid formed in the water by the gaseous emissions is neutralized by a system which adds alkaline solution to the water as necessary to maintain the pH at a nominal value. Water containing the formed sediment at the bottom of the enclosed tank is pumped to one or more clarifiers where a sludge is formed and the remaining water is either disposed of or recycled to the enclosed tank for further use. The sludge formed by the clarifiers is pumped to a compactor which converts the sludge into a non-pourable waste product which is more easily handled and disposed of.

10 Claims, 4 Drawing Figures

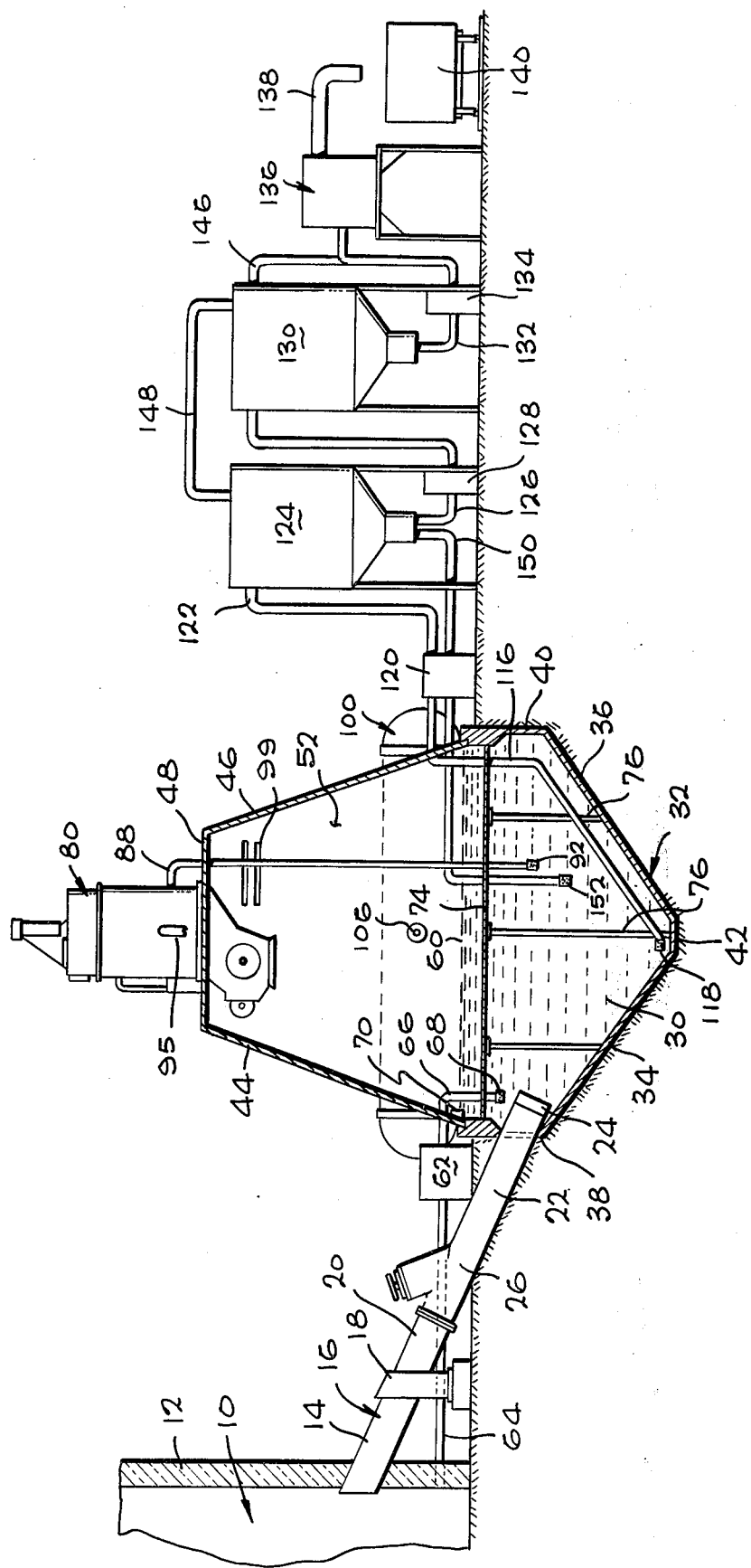

POLLUTION CONTROL SYSTEM

BACKGROUND OF THE INVENTION

1. Field of the Invention

The present invention relates to systems for controlling pollution contained in smoke and other industrial byproducts, and more particularly to a pollution control system for use with a coal or lignite burning electrical power generating plant.

2. History of the Prior Art

The state of the art of pollution control equipment has advanced to the point where a variety of different systems and equipment is available for reducing or eliminating pollutants in smoke, exhaust or other byproducts of various industrial processes. Examples of such systems and equipment are provided by U.S. Pat. Nos. 581,448, 468,408, 2,721,065, 3,756,171, 3,768,981, 3,501,113, 3,125,613, 3,361,150 and 2,772,779. The systems and equipment disclosed by these patents employ various different techniques for removal of pollutants from smoke, flue gases and the like such as by forcing the gases into a body of water and through an apertured device to break up the resulting bubbles. Still other systems use flue gas scrubbers in combination with a settlement tank or the like from which precipitated particulate matter may be withdrawn. It is also known, as evidenced by some of the above mentioned patents, to provide apparatus for automatically controlling the chemical content of water or other liquids used to neutralize and precipitate solid particulates from the gases. However, many of the systems heretofore known have had very limited capacity and thus have not been suitable for large installations. Where large installations are used they are large and complex and thereby add substantially to the capital costs of a plant.

Thus, despite the various techniques and equipment known in the art for providing pollution control of smoke and other waste products of industrial processes, there has yet to be developed a system which is truly effective in reducing to safe levels the pollutants generated by processes involving a very high and rapid consumption of fuels such as coal or lignite. For example, there are in existence electrical power generating plants which burn very large quantities of coal, lignite or similar fuels on a continuous, 24 hour a day basis. Such plants are known to burn as much as 400 tons of coal per hour and are potentially capable of producing as much as 48 tons of ash per hour and 36 tons of sludge per hour. If pollution is properly minimized, the resulting sludge in such plants could amount to as much as 7 railroad hopper carloads of sludge per day. The furnace in such a plant can produce as much as 250,000,000 cubic feet of smoke per minute.

Because of the tremendous volume of pollutants generated on a continuous basis by such plants, conventional pollution control systems and equipment have proven unable to reduce the pollutants to levels considered safe by agencies in charge of policing such matters, thereby placing the continued existence and operation of such plants and the prospects of building new plants in jeopardy. In addition to being incapable of reducing the pollutants in such large industrial plants to safe levels, conventional pollution control equipment typically involves other problems, not the least of which is the inability to withstand the rather harsh chemical byproducts of such plants over reasonable periods of time without the need for continual heavy maintenance and replacement of parts and equipment. Still further problems reside in the fact that many conventional pollution control systems require that the components thereof be installed in and as a part of the industrial plant which generates the pollution, often requiring that the plant be specially designed at the outset so as to include the pollution control equipment. Installation of pollution control equipment in existing plants may thereby be made very difficult or impossible.

Accordingly, it would be advantageous to provide an improved pollution control system.

In particular, it would be advantageous to provide a pollution control system capable of reducing the pollutants generated by large industrial plants such as coal or lignite burning electrical power generating plants to safe levels.

It would furthermore be advantageous to provide a pollution control system having sufficient resistance to the relatively harsh chemical byproducts of most industrial processes so as to be capable of substantially continuous operation with little or no maintenance over long periods of time.

It would still further be advantageous to provide a pollution control system which can be installed completely outside of the industrial plant generating the pollution it is to control, so as to facilitate installation of the system with new plants but particularly in the case of plants which already exist.

BRIEF SUMMARY OF THE INVENTION

Pollution control systems in accordance with the invention employ a unique combination of elements so as to make possible the removal of pollutants from very large volumes of smoke, flue gases and other industrial waste products on a continuous basis. This is accomplished by forcing the smoke or other gaseous media containing the pollutants into a body of water or other liquid of controlled chemical composition so as to chemically neutralize the smoke and at the same time precipitate solid particles from the smoke to form a sediment at the bottom of the water. Fumes, vapors and gases escaping from the top of the water are scrubbed so that the resulting gases released to the atmosphere are substantially pollution free. Water remaining from the scrubbing operation is returned to the body of water, the chemistry of which is controlled by adding alkaline solution as required to neutralize the acid formed in the water and thereby maintain the pH of the water at a selected nominal value. Water containing the formed sediment is continuously removed to a location where a sludge is formed by settling and the remaining water is either disposed of or returned to the body of water in the enclosed tank. The concentration of the sludge is increased to a point at which it is easily handled and thereby removed from the side of the industrial plant and the pollution control system.

In a preferred embodiment of a pollution control system in accordance with the invention smoke produced within a furnace or other portion of an industrial plant is forced through a chimney and into a body of water at the bottom of an enclosed concrete tank. The end of the chimney coupled to the enclosed tank is of stainless steel construction to prevent deterioration thereof from acid which forms in the water. The chemical content of the water is automatically regulated by a system which includes a separate chemical tank outside of the enclosed tank containing an alkaline solution and a pH meter disposed within the enclosed tank in contact with the water. Control equipment responds to the pH meter by adding the alkaline solution to the water as necessary to maintain the pH at a desired nominal value. In this way the acid produced in the water by the smoke is continually neutralized. The body of water within the enclosed tank is maintained at a selected level by apparatus which continually senses the level thereof and adds fresh water as necessary to maintain a desired nominal level of water in the enclosed tank.

The water forces precipitation of particulate matter from the smoke in conjunction with a stainless steel grill which is disposed within the body of water immediately below the surface thereof. This causes the sediment to form at the bottom of the enclosed tank. Fumes and vapors rising from the surface of the water are drawn into one or more fume scrubbers mounted at the top of the enclosed tank where the gases are rendered harmless prior to release to the atmosphere and any remaining water is returned to the body of water at the bottom of the tank.

Water is continuously pumped from the bottom of the enclosed tank so as to carry the sediment which forms at the bottom of the tank to one or more clarifiers where the sediment is formed into a sludge by settling. The remaining clear solution is either disposed of at this point or is returned to the body of water in the enclosed tank. Where two or more clarifiers are used, the sludge formed in the first clarifier is pumped to the second clarifier to further increase the solids concentration thereof prior to pumping the sludge to a compactor. The compactor separates further moisture from the solids in the sludge by centrifugal action, and the remaining solids are then removed from the site such as by loading into railroad hopper cars.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 2 is a ground level side view of the system of FIG. 1 with the enclosed tank thereof appearing in section taken along the line 2—2 of FIG. 1;

DETAILED DESCRIPTION

Figure 1:
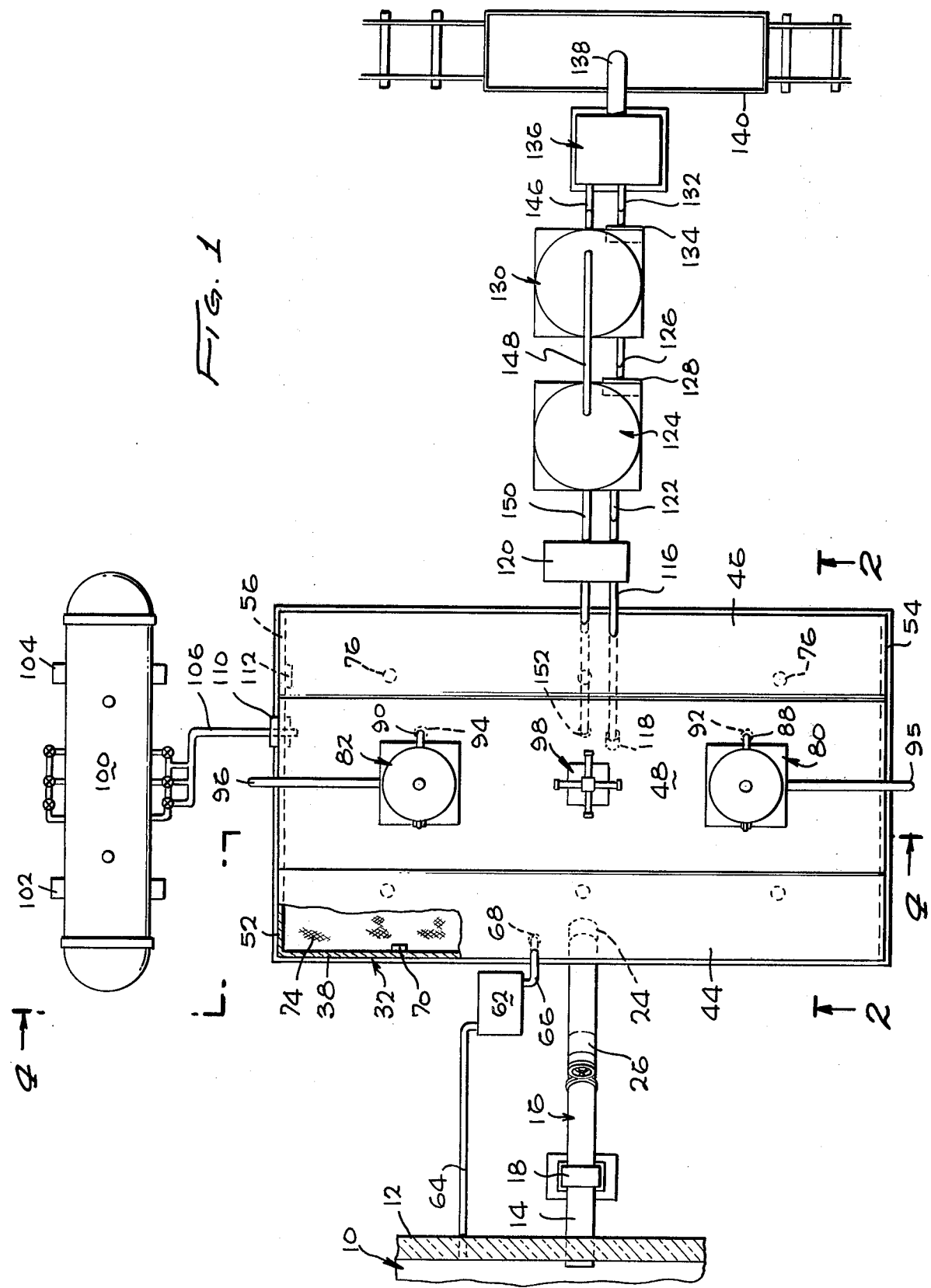
FIG. 1 is a top plan view of a pollution control system in accordance with the invention.
Figure 4:
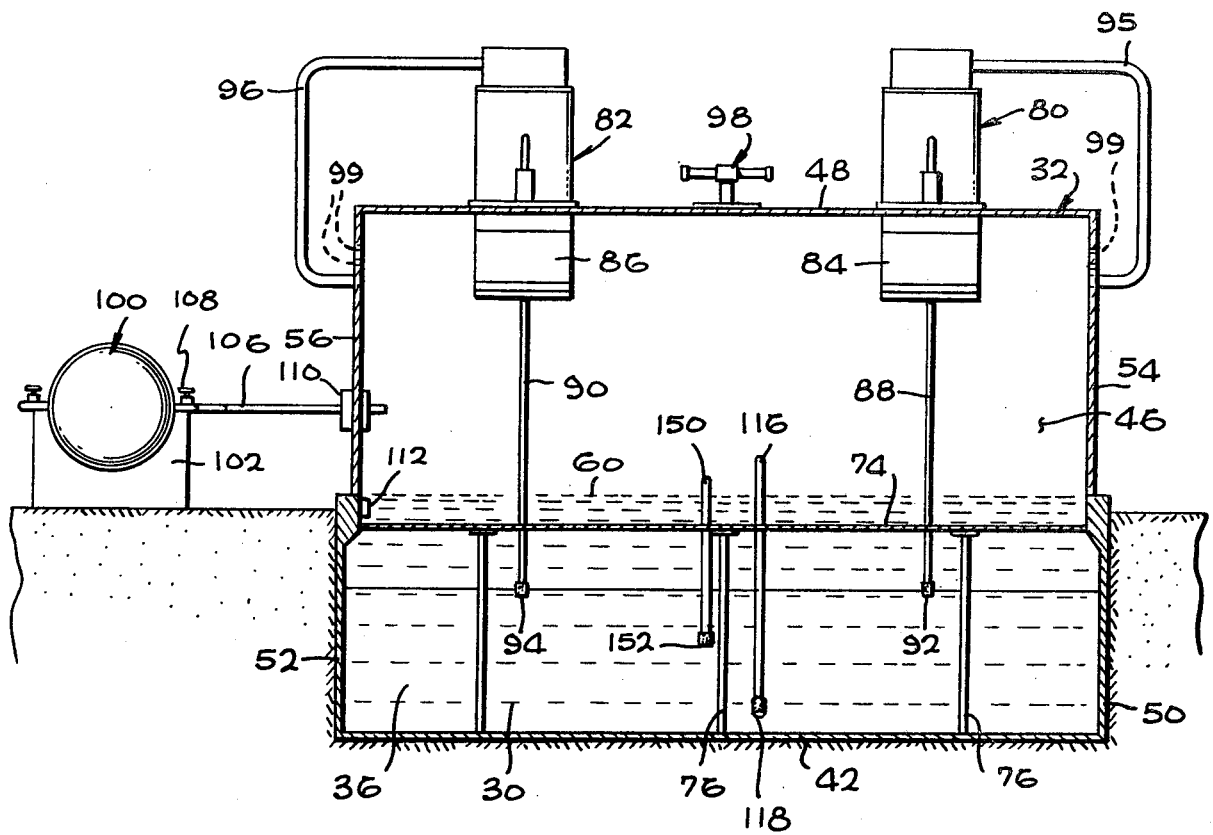
FIG. 4 is a front sectional view of the enclosed tank and the chemical tank of the system of FIG. 1 taken along the line 4—4 of FIG. 1.
Figure 3:
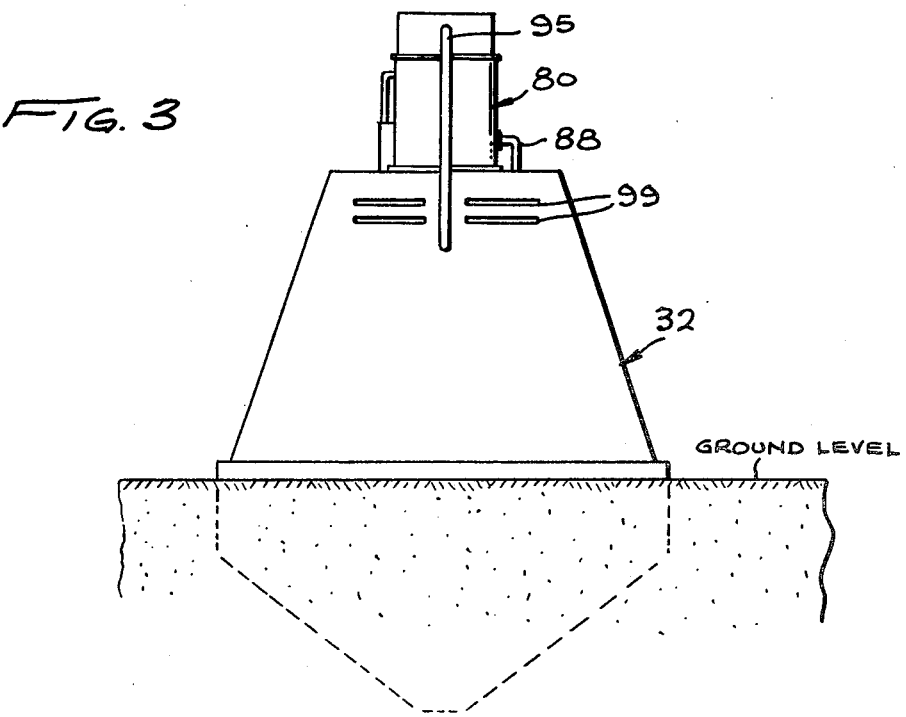
FIG. 3 is a side view of the enclosed tank of the system of FIG. 1.

FIGS. 1–4 show a pollution control system in accordance with the invention used in conjunction with a coal or lignite burning electrical power generating plant. The power generating plant is not shown in the drawings except for a portion of a furnace 10 thereof including an outer wall 12. Extending through the wall 12 is one end 14 of a hollow, generally cylindrical chimney 16. The chimney 16 is held by a support 18 mounted on the ground so as to extend downwardly from a location above ground level at the end 14 into the ground. A first portion 20 of the chimney 16 including the end 14 is lined with ceramic or other appropriate chimney material. The other portion 22 of the chimney 16 is coupled to the first portion 20 and extends into the ground and terminates in a second end 24 opposite the first end 14. The portion 22 is of stainless steel construction so as to render the chimney virtually maintenance free as discussed hereafter.

While not shown in FIGS. 1 and 2, the furnace 10 is enclosed so as to force the smoke generated therein into the end 14 and through the chimney 16. A check valve 26 forming a part of the second portion 22 of the chimney 16 is normally open, allowing the smoke to pass freely through the chimney to the opposite end 24 under the pressure built up within the furnace 10. However, the valve 26 may be closed when desired to isolate the end 24 of the chimney from the furnace 10.

Smoke forced through the chimney 16 flows out of the end 24 into a body of water 30 at the bottom of an enclosed tank 32. The tank 32 is of concrete construction and is disposed partly above and partly below ground level. The bottom portion of the tank 32 is comprised principally of a pair of opposite, generally planar concrete members 34 and 36 extending downwardly and inwardly from opposite sides 38 and 40 respectively of a generally rectangular midportion of the tank and terminating in an elongated, narrow common member 42. The upper portion of the enclosed tank 32 includes a pair of opposite, generally planar concrete members 44 and 46 extending upwardly and inwardly from the opposite sides 38 and 40 respectively, and terminating at the opposite edges of a generally planar top member 48. The opposite ends of the bottom portion of the enclosed tank 32 are comprised of an opposite pair of generally planar end members 50 and 52 extending between and contacting the opposite sides 38 and 40, and the members 34, 36 and 42. The opposite ends of the upper portion of the enclosed tank 32 comprise an opposite pair of generally planar end members 54 and 56 respectively mounted on top of the end members 50 and 52 and extending between and contacting the members 44 and 46 and the top member 48.

The top of the body of water 30 reaches a level 60 which is slightly above ground level. The water is maintained at the level 60 by an automatic valve 62 coupled between a line 64 to a fresh water supply (not shown) and a line 66 passing through the member 44 of the enclosed tank 32 and extending downwardly and terminating in a filtered lower end 68. A moisture sensitive element 70 is mounted on the inside of the enclosed tank 32 adjacent the desired water level 60 in addition to being coupled to the valve 62. The valve 62 is normally in a closed position so as to cut off the line 66 from the line 64. When the water falls below the desired level 60, however, the element 70 senses this condition, causing the valve 62 to open and feed fresh water from the line 64 into the inside of the enclosed tank 62 via the line 66. When the water has risen to the desired 60, the element 70 causes the valve 62 to close. In this manner, the valve 62 and the element 70 operate in conjunction with each other to maintain the level of the body of water 30 at the desired level 60.

A relatively thin, generally planar stainless steel grill 74 is mounted in a generally horizontal position a few feet below the water level 60 within the enclosed tank 32 so as to extend between the opposite sides 38 and 40 and the opposite end members 50 and 52 of the tank 32. The grill 74 is held in place by nine different supports 76 extending upwardly from the bottom members 34, 36 and 42 into contact with the grill 74.

The end 24 of the chimney 16 extends through the side 38 of the enclosed tank 32 below the grill 74 such that the smoke flowing through the chimney from the furnace 10 is caused to exit the chimney within the body of water 30 and below the grill 74. As the smoke enters the water, particulate matter is precipitated. The particulate matter slowly settles at the bottom of the tank 32 just above the member 42, encouraged by the slope of the members 34 and 36. Air bubbles within the water caused by the smoke rise into contact with the grill 74 which breaks up the bubbles and enhances further precipitation of particulate matter in the water. Fumes and vapors which rise from the surface of the body of water 30 are drawn into either of a pair of fume scrubbers 80 and 82 respectively. The fume scrubbers 80 and 82 are mounted on the top member 48. The fume scrubbers 80 and 82 in the present example are of the water wash type and, by way of example, can comprise fume scrubbers sold by Duall Company as Model No. PT500. As such, the scrubbers 80 and 82 remove pollutants from the gases within the fumes and vapors so that relatively pure gases are released from the scrubbers 80 and 82. The pollutants and moisture which accumulate from the vapors and fumes within the scrubbers 80 and 82 are returned to the body of water 30 by return pipes 88 and 90 respectively extending from the scrubbers 80 and 82. The return pipes 88 and 90 are generally vertically disposed so as to extend downwardly into the body of water 30 and terminate in filtered lower ends 92 and 94 respectively. At the same time any exhaust from the fume scrubbers 80 and 82 is returned to the inside of the enclosed tank 32 via exhaust return pipes 95 and 96 respectively. The exhaust return pipe 95 couples the fume scrubber 80 through the top of the end member 54. The exhaust return pipe 96 couples the fume scrubber 82 through the top of the end member 56.

The fume scrubbers 80 and 82 operate in continuous fashion to draw the vapors and fumes emanating from the surface of the water 30 and clean such fumes so that the gases thereof can be safely released to the atmosphere, thereby preventing a pressure buildup of fumes and vapors within the enclosed tank 32. At the same time the pollutants are continually returned from the scrubbers 80 and 82 to the body of water 30 via the return pipes 88 and 90. In spite of this should excessive pressure build up within the enclosed container 32, a pressure relief valve 98 mounted on the top member 48 of the tank 32 between the fume scrubbers 80 and 82 is provided. Conversely, buildup of an excessive vacuum within the enclosed tank 32 due to the action of the fume scrubbers 80 and 82 is prevented by the presence of a plurality of small vents 99 near the top of each of the opposite end members 54 and 56.

An enclosed chemical tank 100 is mounted on a pair of supports 102 and 104 adjacent the end member 52 of the enclosed tank 32. The inside of the tank 100 which is filled with an alkaline solution is coupled by a line 106 through a valve 110 mounted in the member 52 of the enclosed tank 32. The line 106 extends through the valve 110 and into the interior of the enclosed tank 32. The valve 110 is operated automatically in response to a pH meter 112 mounted on the inside of the enclosed tank 32 below the level 60 of the body of water 30.

As smoke from the chimney 16 is introduced into the body of water 30, acidic chemicals such as sulfuric acid, are formed in the water. In the absence of the alkaline solution within the tank 100 the acidity of the water would continue to increase as more and more smoke from the chimney is introduced into the water. However, the acidity of the water is continually monitored by the pH meter 112 which is operative to open the valve 110 and admit alkaline solution to the body of water 30.

As more and more smoke is introduced into the body of water 30 from the chimney 16, increasing amounts of particulate matter are precipitated by the water and settle to the bottom of the tank 32, forming a sediment. This sediment is removed from the tank 32 by a pickup tube 116 of stainless steel construction having a filtered first end 118 disposed at the bottom of the inside of the enclosed tank 32 just above the concrete member 42. The pickup tube 116 extends through a pump 120 and terminates in an opposite second end 122 coupled to the top of a clarifier 124. The pump 120 continuously pumps water and the included sediment from the bottom of the tank 32 into the clarifier 124. As the water and included sediment enter the clarifier 124, the sediment settles to the bottom of the clarifier, forming a sludge. The sludge is removed from the clarifier 124 by a tube 126 which passes through a pump 128 and enters the top of a second clarifier 130. Within the clarifier 130 the sludge settles to the bottom where it becomes even more concentrated. The sludge at the bottom of the clarifier 130 is carried by a tube 132 through which it is pumped by a pump 134 to a sludge compactor 136. In the sludge compactor 136 the sludge pumped from the clarifier 132 is concentrated, either by filtration or centrifugal force, into a non-pourable waste product. The result is a relatively dry solid substance which is pumped via a spout 138 into a waiting railroad hopper car 140.

As the entering sludge settles to the bottom within the clarifiers 124 and 136, relatively clear fluid rises to the top of each clarifier. While the clear fluid in the clarifiers 124 and 130 may be disposed of by flowing into a drain, such fluid is preferably recycled to the enclosed tank 32 for reuse. The clear fluid from the compactor 136 flows via a tube 146 to the clarifier 130 where it combines with the clear fluid therein. The combined clear fluid flows through a tube 148 to the first clarifier 124. The clear fluid within the clarifier 124 exits via a return tube 150 which extends through the pump 120 and into the enclosed tank 32 where it terminates in a filtered end 152.

The clarifiers 124 and 130 are available units which may be of the vari-floculator type and may, for example, comprise clarifiers sold by Platers' Equipment and Supplies Inc. as Model No. 1013F. The compactor 136 is preferably of the laminar type and may, for example, comprise a compactor sold by Platers' Equipment and Supplies, Inc. as Model No. 1L35P. The resulting arrangement forms a sludge within the clarifiers 124 and 130 which is about 2% solids. The compactor 136 removes enough moisture by centrifugal force or filtration such that the remaining sludge loaded into the railroad car 140 via the spout 138 is 60–85% solids.

The pollution control system described thus far is capable of undergoing the substantial purifying operation described with very little or no maintenance over relatively long periods of time. This is due principally to the fact that those portions of the system in contact with strong chemicals are of either stainless steel or concrete construction. Thus, the entry portion of the chimney 16 may be lined in conventional ceramic material because the smoke exiting the furnace 10 is not especially corrosive. However the sulfuric acid formed in the body of water 30 and which is present in varying degrees in subsequent portions of the system is highly corrosive. For this reason, the portion 22 of the chimney 16 which enters the body of water 30 is of stainless steel construction, as is the grill 74 and pickup and return tubes 116 and 150. The tubes 126, 132, 146 and 148 may be of stainless steel construction if desired, but need not be for most applications because of the relatively low acidity of the sludge and the separated clear liquid. The enclosed tank 32 is itself virtaully maintenance free because the concrete composition thereof is capable of withstanding relatively high acid concentrations and other chemicals in the water.

It will further be appreciated that pollution control systems in accordance with the invention do not require special equipment or structures within the industrial plant they are controlling and are therefore easily added to existing industrial plants. All that is required is an adjacent parcel of ground large enough to accommodate the enclosed tank 32, the chemical tank 100, the clarifiers 124 and 130 and the compactor 136. The pollution control system is coupled to the plant simply by forming a hole in the furnace wall 12 so that the chimney may be coupled to the furnace.

While the invention has been particularly shown and described with reference to a preferred embodiment thereof, it will be understood by those skilled in the art that various changes in form and details may be made therein without departing from the spirit and scope of the invention.

What is claimed is:

1. A pollution control system comprising the combination of a tubular element for receiving polluted gases, an enclosed container having a quantity of liquid disposed at the bottom thereof, means for maintaining the liquid at a nominal level within the container, the tubular element being coupled to and communicating with the inside of the container below the nominal level for the liquid, grill means mounted within the container, the grill means being disposed below the nominal level for the liquid and above the tubular element, fume scrubber means mounted in the enclosed tank above the top of the liquid and including means for returning liquid to the liquid, clarifier means disposed outside the enclosed container, liquid pickup line means having one end coupled to and communicating with the inside of the container below the nominal level for the liquid and an opposite end coupled to the clarifier means to deliver liquid from the enclosed container to the clarifier means for separation of particulate matter therefrom, compactor means, and line means coupled between the clarifier means and the compactor means for delivering particulate matter separated from the liquid by the clarifier means to the compactor means.

2. A pollution control system comprising the combination of a chimney for receiving polluted gases, an enclosed tank having a quantity of liquid disposed at the bottom thereof, means for maintaining the liquid at a nominal level within the tank, the chimney being coupled to and communicating with the inside of the tank below the nominal level for the liquid, a grill mounted within the tank, the grill being disposed below the nominal level for the liquid and above the chimney, at least one fume scrubber mounted in the enclosed tank above the top of the liquid and having a fume return line extending into the liquid, at least one clarifier disposed outside of the enclosed tank, a liquid pickup line having one end coupled to and communicating with the inside of the tank below the nominal level for the liquid and an opposite end coupled to the at least one clarifier to deliver liquid from the enclosed tank to the at least one clarifier for separation of particulate matter therefrom, a compactor, and a line coupled between the at least one clarifier and the compactor for delivering particulate matter separated from the liquid by the at least one clarifier to the compactor.

3. The invention set forth in claim 2, further including a liquid return line having one end coupled to and communicating with the inside of the tank and an opposite end coupled to the at least one clarifier to return liquid from the at least one clarifier to the enclosed tank.

4. The invention set forth in claim 1, wherein the means for maintaining the liquid at a nominal level within the tank includes a supply of the liquid, means for sensing the level of the liquid in the enclosed tank, and means coupled between the supply of the liquid and the inside of the enclosed tank and responsive to the means for sensing for feeding liquid from the supply to the tank as necessary to maintain the liquid in the enclosed tank at the nominal level.

5. The invention set forth in claim 2, wherein the portion of the chimney coupled to and communicating with the inside of the tank is of stainless steel construction, the grill is of stainless steel construction, and the enclosed tank is of concrete construction.

6. The invention set forth in claim 2, further including a second tank for storing a chemical, means disposed within the liquid in the first-mentioned tank for monitoring a chemical condition within the liquid, and means coupling the second tank to the inside of the first-mentioned tank and responsive to the means for monitoring for feeding the chemical into the liquid as necessary to maintain the chemical condition within the liquid at a predetermined level.

7. The invention set forth in claim 6, wherein the means for monitoring comprises a pH meter.

8. For use with an industrial plant having a lignite or coal burning furnace, a pollution control system comprising an enclosed tank of essentially concrete construction disposed partly below and partly above ground level, an elongated hollow chimney having a first end coupled to the furnace above ground level and extending downwardly below ground level and terminating in an opposite second end of essentially stainless steel construction coupled to the inside of the enclosed tank, a stainless steel grill extending generally horizontally across the inside of the tank above the second end of the chimney, a source of water, means coupling the source of water to the inside of the enclosed tank and including means for feeding water from the source of water to the inside of the enclosed tank as necessary to maintain water in the enclosed tank at a selected level above the grill, at least one fume scrubber mounted in the enclosed tank above said selected level and having a return line extending downwardly below said selected level, a container mounted on the ground adjacent the enclosed tank and having an alkaline solution therein, a pH meter mounted within the enclosed tank in contact with water therein, means coupling the inside of the container to the inside of the enclosed tank and including means responsive to the pH meter for feeding alkaline solution from the container to the inside of the enclosed tank as necessary to maintain the pH of water in the enclosed tank at a selected value, at least one clarifier mounted on the ground adjacent the enclosed tank, a first line coupled between the clarifier and the inside of the enclosed tank below the selected level, a first pump coupled in said first line for pumping water from the enclosed tank to the clarifier, a compactor mounted on the ground adjacent the clarifier, a second line coupled between the clarifier and the compactor and a second pump coupled in said second line for pumping water from the clarifier to the compactor.

9. The invention set forth in claim 8, further including a second fume scrubber mounted in the enclosed tank above said selected level and having a return line extending downwardly below said selected level.

10. The invention set forth in claim 9, further including a second clarifier mounted on the ground adjacent the first-mentioned clarifier and the compactor and coupled in the second line between the first-mentioned clarifier and the second pump and a third pump coupled in the second line between the first-mentioned clarifier and the second clarifier.

* * * * *